(12) United States Patent
Murata et al.

(10) Patent No.: US 10,983,396 B2
(45) Date of Patent: Apr. 20, 2021

(54) METHOD FOR PRODUCING LIQUID CRYSTAL PANEL, AND LIQUID CRYSTAL PANEL

(71) Applicant: SHARP KABUSHIKI KAISHA, Sakai (JP)

(72) Inventors: Koji Murata, Sakai (JP); Akira Sakai, Sakai (JP); Yuichi Kawahira, Sakai (JP); Takako Koide, Sakai (JP); Masahiro Hasegawa, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/829,989

(22) Filed: Mar. 25, 2020

(65) Prior Publication Data

US 2020/0310182 A1    Oct. 1, 2020

Related U.S. Application Data

(60) Provisional application No. 62/825,394, filed on Mar. 28, 2019.

(51) Int. Cl.
*G02F 1/133*    (2006.01)
*G02F 1/13363*    (2006.01)
*G02F 1/1335*    (2006.01)

(52) U.S. Cl.
CPC .... *G02F 1/13363* (2013.01); *G02F 1/133528* (2013.01); *G02F 2001/133633* (2013.01)

(58) Field of Classification Search
CPC ........................................................ G02F 1/137
See application file for complete search history.

(56) References Cited

U.S. PATENT DOCUMENTS

2015/0104656 A1* 4/2015 Suga .................. B29C 66/1122
                                                              428/446
2015/0277007 A1   10/2015 Matsuyama et al.
(Continued)

FOREIGN PATENT DOCUMENTS

JP    2015-200877 A    11/2015
JP    2017-015845 A    1/2017

*Primary Examiner* — Sang V Nguyen
(74) *Attorney, Agent, or Firm* — ScienBiziP, P.C.

(57) ABSTRACT

The present invention relates to a method for producing a liquid crystal panel. The method includes curing a first reactive mesogen layer with ultraviolet light at an illuminance within a range of 40 to 90 mW/cm$^2$. The liquid crystal panel includes a first transparent base material, a TFT layer and a first alignment film stacked in order on the first transparent base material, a second transparent base material, a color filter layer, an in-cell retardation layer, and a second alignment film stacked in order on the second transparent base material, a liquid crystal layer sandwiched between the first alignment film and the second alignment film, an out-cell retardation layer disposed on a side opposite to a color filter layer side of the second transparent base material, and a pair of linearly polarizing plates arranged so as to sandwich the first transparent base material and the out-cell retardation layer and having transmission axes orthogonal to each other. The in-cell retardation layer includes the first reactive mesogen layer and a second reactive mesogen layer. The first reactive mesogen layer and the second reactive mesogen layer have different material wavelength dispersibilities and have slow axes arranged orthogonal to each other.

3 Claims, 5 Drawing Sheets

(56) References Cited

U.S. PATENT DOCUMENTS

| | | | |
|---|---|---|---|
| 2016/0062157 A1* | 3/2016 | Kim | G02F 1/1337 349/33 |
| 2016/0062510 A1* | 3/2016 | Tomohisa | B32B 7/02 428/1.4 |
| 2017/0306054 A1* | 10/2017 | Boone | B32B 27/281 |
| 2018/0047600 A1* | 2/2018 | Majima | G01J 1/0429 |
| 2019/0278139 A1* | 9/2019 | Smith | G02F 1/133528 |

* cited by examiner

METHOD FOR PRODUCING LIQUID CRYSTAL PANEL, AND LIQUID CRYSTAL PANEL

CROSS-REFERENCE TO RELATED APPLICATIONS

The present application claims priority under 35 U.S.C. § 119 to U.S. Provisional Application No. 62/825,394 filed on Mar. 28, 2019, the contents of which are incorporated herein by reference in their entirety.

BACKGROUND OF THE INVENTION

Field of the Invention

The present invention relates to a method for producing a liquid crystal panel, and a liquid crystal panel.

Description of Related Art

Liquid crystal display devices are display devices that use liquid crystal compositions for display, and the typical display mode thereof is irradiating a liquid crystal panel containing a liquid crystal composition sealed between a pair of substrates with backlight and applying voltage to the liquid crystal composition to change the alignment of liquid crystal molecules, thereby controlling an amount of light passing through the liquid crystal panel. Such liquid crystal display devices have features including a thin profile, light weight, and low power consumption, and have therefore been used for electronic devices such as televisions, smartphones, tablet terminals, and car navigation systems. In such a liquid crystal display device, a retardation film may be used for the purpose of prevention of external light reflection, color tone compensation, viewing angle compensation, and the like.

When a conventional liquid crystal display device is used in a bright place such as outdoors, the contrast ratio may be reduced due to influence of external light reflected inside and on the surface of the liquid crystal display device, and display quality may be reduced. On the other hand, by attaching a retardation film to a viewing surface side of a liquid crystal panel, a reflectance of external light can be reduced, and outdoor visibility can be improved. In order to effectively improve the outdoor visibility, a retardation film capable of satisfying the λ/4 condition in a wide band has been required.

In order to reduce the thickness of the liquid crystal display device and reduce the number of members, instead of attaching a retardation film to the liquid crystal panel, a retardation layer (also referred to as "in-cell retardation layer") has been desired to be provided in the liquid crystal panel.

Prior art documents that disclose a retardation film include, for example, JP 2017-15845 A and JP 2015-200877 A. JP 2017-15845 A describes an inverse dispersion film for organic EL, which contains a cellulose ester and a compound for adjusting the polarizability of the cellulose ester, in order to satisfy the λ/4 condition in a wide band. JP 2015-200877 A describes in detail a material of an optical film which exhibits reverse wavelength dispersibility.

In recent years, in connection with a demand for a low-reflection liquid crystal panel having a wide viewing angle and high outdoor visibility, research and development of a liquid crystal panel including an in-cell retardation layer have been promoted. According to the study of the present inventor, when a liquid crystal panel including an in-cell retardation layer is subjected to a long-term reliability test (condition example: 60° C. 90% RH, 1000 hours), there has occurred such a display defect that an outer peripheral portion of the liquid crystal panel is whitened during black display of the liquid crystal panel.

BRIEF SUMMARY OF THE INVENTION

The present invention has been made under the current situation in the art and aims to provide a method for producing a liquid crystal panel having good long-term reliability and excellent low reflection characteristics and a liquid crystal panel obtained by the production method.

(1) An embodiment of the present invention is directed to a method for producing a liquid crystal panel, including curing a first reactive mesogen layer with ultraviolet light, and illuminance of the ultraviolet light is in a range of 40 to 90 mW/cm², the liquid crystal panel including a first transparent base material, a TFT layer and a first alignment film stacked in order on the first transparent base material, a second transparent base material, a color filter layer, an in-cell retardation layer, and a second alignment film stacked in order on the second transparent base material, a liquid crystal layer sandwiched between the first alignment film and the second alignment film, an out-cell retardation layer disposed on a side opposite to a color filter layer side of the second transparent base material, and a pair of linearly polarizing plates arranged so as to sandwich the first transparent base material and the out-cell retardation layer and having transmission axes orthogonal to each other, the in-cell retardation layer including the first reactive mesogen layer and a second reactive mesogen layer, the first reactive mesogen layer and the second reactive mesogen layer having different material wavelength dispersibilities and having slow axes arranged orthogonal to each other.

(2) An embodiment of the present invention is directed to a liquid crystal panel produced by the method for producing a liquid crystal panel.

(3) In an embodiment of the present invention, the liquid crystal panel includes the structure (2), and the first reactive mesogen layer satisfies the following formula (1) and the second reactive mesogen layer satisfies the following formula (2):

$$1.01 \leq Re(450)/Re(550) \leq 1.05 \qquad (1)$$

$$1.05 < Re(450)/Re(550) \leq 1.2 \qquad (2)$$

wherein Re(450) represents an in-plane retardation for light having a wavelength of 450 nm and Re(550) represents an in-plane retardation for light having a wavelength of 550 nm.

(4) In an embodiment of the present invention, the liquid crystal panel includes the structure (2), and the in-cell retardation layer satisfies the following formula (3):

$$0.85 \leq Re(450)/Re(550) \leq 0.95 \qquad (3)$$

wherein Re(450) represents an in-plane retardation for light having a wavelength of 450 nm and Re(550) represents an in-plane retardation for light having a wavelength of 550 nm.

(5) In an embodiment of the present invention, the liquid crystal panel includes the structure (2), and at least one organic layer and/or inorganic layer is provided between the first reactive mesogen layer and the second reactive mesogen layer.

(6) In an embodiment of the present invention, the liquid crystal panel includes the structure (2), and at least one organic layer and/or inorganic layer is provided between the second reactive mesogen layer and the second alignment film.

The present invention can provide a method for producing a liquid crystal panel having good long-term reliability and excellent low reflection characteristics and a liquid crystal panel obtained by the production method.

DETAILED DESCRIPTION OF THE INVENTION

Hereinafter, embodiments of the present invention will be described. The present invention is not limited to the contents described in the following embodiments, but can be appropriately modified in design within the range that satisfies the configuration of the present invention.

Definition of Terms

In the present specification, a "retardation layer" means a retardation layer that imparts an in-plane retardation of 10 nm or more to light having a wavelength of at least 550 nm. The light having a wavelength of 550 nm is light of a wavelength at which human has the highest visual sensitivity. The in-plane retardation is defined by $R=(ns-nf) \times d$. Here, ns represents a larger one of principal refractive indices nx and ny in an in-plane direction of the retardation layer, and nf represents a smaller one of the principal refractive indices nx and ny in the in-plane direction of the retardation layer. The principal refractive index refers to a value for light having a wavelength of 550 nm unless otherwise noted. An in-plane slow axis of the retardation layer refers to an axis in a direction corresponding to ns, and an in-plane fast axis refers to an axis in a direction corresponding to nf. d represents a thickness of the retardation layer. In the present specification, the "retardation" means an in-plane retardation unless otherwise noted.

In the present specification, a "λ/4 retardation layer" means a retardation layer imparting in-plane retardation of ¼ wavelength (137.5 nm) to at least light having a wavelength of 550 nm and may be a retardation layer imparting in-plane retardation of 100 nm or more and 176 nm or less.

In the present specification, "wavelength dispersibility of the retardation layer" refers to a correlation between an absolute value of retardation imparted by the retardation layer and a wavelength of incident light. In a visible light region, a property that the absolute value of retardation imparted by the retardation layer does not change even when the wavelength of the incident light changes is referred to as "flat wavelength dispersibility". Furthermore, in the visible light region, a property that the absolute value of retardation imparted by the retardation layer decreases as the wavelength of the incident light increases is referred to as "positive wavelength dispersibility", and a property that the absolute value of retardation imparted by the retardation layer increases as the wavelength of the incident light increases is referred to as "reverse wavelength dispersibility".

Embodiment 1

Figure 1:
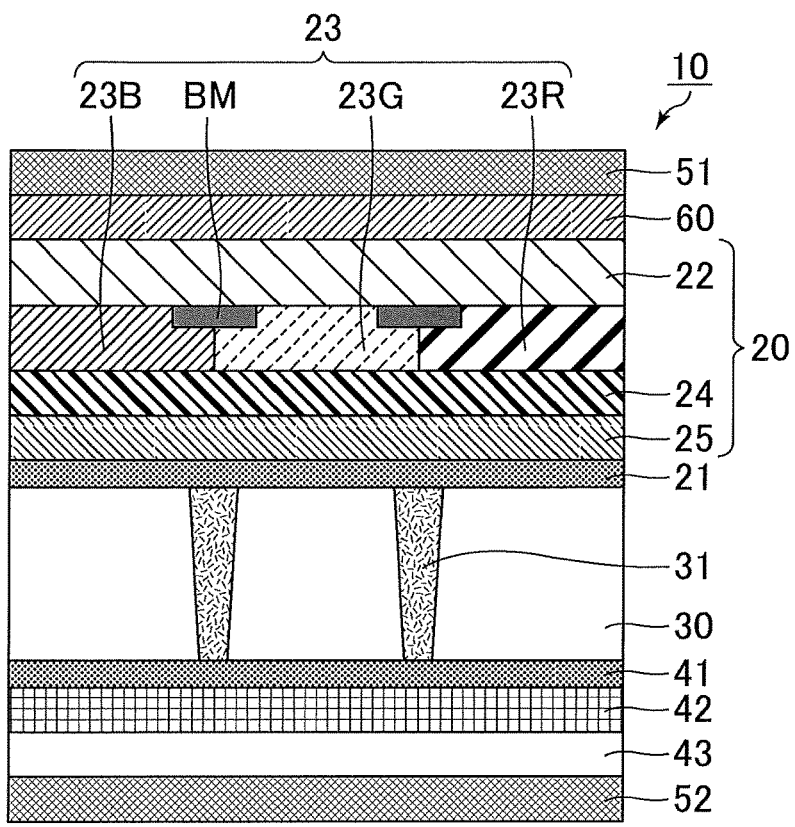
FIG. 1 is a schematic cross-sectional view showing a liquid crystal panel of Embodiment 1.

FIG. 1 is a schematic cross-sectional view showing a liquid crystal panel of Embodiment 1. As shown in FIG. 1, the liquid crystal panel of Embodiment 1 includes a first linearly polarizing plate 51, an out-cell retardation layer 60, a second transparent base material 22, a color filter layer 23, a first reactive mesogen layer 24, a second reactive mesogen layer 25, a second alignment film 21, a liquid crystal layer 30, a first alignment film 41, a TFT layer 42, a first transparent base material 43, and a second linearly polarizing plate 52 in the stated order from the viewing surface side to the back surface side. In the case of a transmissive or transflective liquid crystal display device, a backlight (not shown) for irradiating light toward the liquid crystal layer 30 is disposed on the back surface side of the second linearly polarizing plate 52. The out-cell retardation layer 60 is provided outside a liquid crystal cell (provided closer to the viewing surface side than the second transparent base material 22), and is therefore called an "out-cell retardation layer".

As the first linearly polarizing plate 51 and the second linearly polarizing plate 52, polarizers (absorptive polarizing plate) obtained by dyeing and adsorbing an anisotropic material such as iodine complex (or dye) on a polyvinyl alcohol (PVA) film and then drawing and aligning the film can be used, for example. Typically, in order to ensure mechanical strength and moisture and heat resistance, a protective film such as a triacetyl cellulose (TAC) film is laminated on both sides of the PVA film before practical application.

A transmission axis of the first linearly polarizing plate 51 and a transmission axis of the second linearly polarizing plate 52 are orthogonal to each other. According to such a configuration, since the first linearly polarizing plate 51 and the second linearly polarizing plate 52 are arranged in a crossed Nicols relationship, a good black display state can be realized during no voltage application. In the following description, the azimuth of the transmission axis of the second linearly polarizing plate 52 is defined as 0°. At this time, the azimuth of the transmission axis of the first linearly polarizing plate 51 is 90°.

The out-cell retardation layer 60 functions as a $\lambda/4$ retardation layer, and a combination of the first linearly polarizing plate 51 and the out-cell retardation layer 60 functions as a circular polarizing plate. By virtue of the circular polarizing plate, internal reflection of the liquid crystal display device can be reduced, so that reflection (projection) of external light can be suppressed. Therefore, high-contrast display can be performed even in a bright environment with strong external light.

The material of the out-cell retardation layer 60 is not limited, however, since the out-cell retardation layer 60 can be formed by adhering it to the second transparent base material 22, a stretched polymer film (retardation film) generally used in the field of liquid crystal display devices is preferably used. Examples of the material of the polymer film include cycloolefin polymers, polycarbonates, polysulfones, polyether sulfones, polyethylene terephthalates, polyethylenes, polyvinyl alcohols, norbornenes, triacetylcelluloses, and diacetylcelluloses, among which cycloolefin polymers are particularly preferred. A retardation layer formed of a cycloolefin polymer is excellent in durability, and has an advantage that a change in retardation is small when the retardation layer is exposed to a high-temperature environment or a high-temperature and high-humidity environment for a long time of period.

Similarly to the first reactive mesogen layer 24 and the second reactive mesogen layer 25 described below, the out-cell retardation layer 60 may be formed of a photopolymerizable liquid crystal material (reactive mesogen). As a method of forming the out-cell retardation layer 60 with a photopolymerizable liquid crystal material, it is possible to use a method of applying the photopolymerizable liquid crystal material onto a flat base film such as a PET film to form a film, then transferring the obtained film to the first linearly polarizing plate 51 or the second transparent base material 22 via an adhesive or a pressure-sensitive adhesive, and finally peeling the base film or a method of applying the photopolymerizable liquid crystal material directly to the outside of the second transparent base material 22 (surface on the observer side) to form a film.

As the second transparent base material 22 and the first transparent base material 43, a glass substrate and a plastic substrate are used, for example.

The color filter layer 23 has a configuration in which a red color filter 23R, a green color filter 23G, and a blue color filter 23B are arranged in a plane and partitioned by a black matrix BM. The red color filter 23R, the green color filter 23G, the blue color filter 23B, and the black matrix BM are formed of, for example, a transparent resin containing a pigment. Usually, a combination of the red color filter 23R, the green color filter 23G, and the blue color filter 23B is disposed in all pixels, and a desired color is obtained at each pixel by mixing colors while controlling the amount of color light transmitted through the red color filter 23R, the green color filter 23G, and the blue color filter 23B. For example, a black photosensitive acrylic resin can be used as the black matrix BM. The thicknesses of the red color filter 23R, the green color filter 23G, and the blue color filter 23B may not be the same. That is, the surface of the color filter layer 23 on the liquid crystal layer 30 side may not be flat.

The first reactive mesogen layer 24 and the second reactive mesogen layer 25 constitute a laminated retardation layer, and preferably have the same function as a $\lambda/4$ retardation layer showing a single-layer reverse wavelength dispersibility. The "reactive mesogen layer" means a layer formed of cured polymerizable liquid crystal (reactive mesogen). The reactive mesogen layer can be formed, for example, by applying polymerizable liquid crystal onto a base alignment film undergone alignment treatment and curing the polymerizable liquid crystal by baking, light irradiation, or the like. The cured polymerizable liquid crystal aligns along the alignment azimuth of the base alignment film, which has been given by the alignment treatment, to cause retardation. Such a reactive mesogen layer (coating retardation layer) has an advantage that it can be made thinner than a retardation layer formed of a resin film.

In the present specification, the $\lambda/4$ retardation layer provided inside the liquid crystal cell (provided closer to the back surface side than the second transparent base material 22) is referred to as "in-cell retardation layer". The in-cell retardation layer may include a layer other than the first reactive mesogen layer 24 and the second reactive mesogen layer 25. For example, at least one organic layer and/or inorganic layer may be provided between the first reactive mesogen layer 24 and the second reactive mesogen layer 25. At least one organic layer and/or inorganic layer may be provided between the second reactive mesogen layer 25 and the second alignment film 21. Specific examples of the organic layer and the inorganic layer include an overcoat layer and a $SiO_2$ layer. The organic layer and the inorganic layer have an effect of suppressing elution of impurities from the first reactive mesogen layer 24 to the liquid crystal layer 30, which causes a reduction in a voltage holding ratio (VHR). This is particularly effective when the first reactive mesogen layer 24 is a retardation layer having flat wavelength dispersibility.

The in-cell retardation layer is used in combination with the out-cell retardation layer 60. Although black display cannot be performed in circularly polarized transverse electric field mode liquid crystal incorporating only the out-cell retardation layer 60, the in-cell retardation layer optically compensates the out-cell retardation layer 60, so that it is possible to establish a state in which optically both layers are not substantially present. Consequently, a configuration is established which is optically equivalent to conventional transverse electric field mode liquid crystal having no circularly polarized light, so that black display can be performed. Therefore, in the in-cell retardation layer and the out-cell retardation layer 60, it is preferable to design the retardation value and axis arrangement so that retardations are mutually cancelled out with respect to light entering a liquid crystal cell from a backlight. Specifically, the in-cell retardation layer and the out-cell retardation layer 60 preferably have the same wavelength dispersibility.

A difference between an in-plane retardation of the first reactive mesogen layer 24 and an in-plane retardation of the second reactive mesogen layer 25 is a retardation of a laminated retardation plate. Therefore, it is preferable to make an absolute value of the in-plane retardation and wavelength dispersibility of both layers different, and set the difference to be $\lambda/4$ in a wide wavelength range of the visible light region. Wavelength dispersibility of the laminated retardation plate can be adjusted by changing balance of the retardation between the first reactive mesogen layer 24 and the second reactive mesogen layer 25.

When the in-plane retardation for light having a wavelength of 450 nm is represented by Re(450) and the in-plane retardation for light having a wavelength of 550 nm is represented by Re(550), the in-cell retardation layer preferably satisfies the following formula:

$$0.85 \leq Re(450)/Re(550) \leq 0.95$$

The first reactive mesogen layer 24 is preferably a negative retardation layer exhibiting negative refractive index anisotropy. In the first reactive mesogen layer 24, an absolute value of retardation with respect to light having a wavelength of 550 nm is preferably 300 to 500 nm, more preferably 350 to 450 nm.

The second reactive mesogen layer 25 is preferably a positive retardation layer exhibiting positive refractive index anisotropy. In the second reactive mesogen layer 25, an absolute value of retardation with respect to light having a wavelength of 550 nm is preferably 100 to 300 nm, more preferably 150 to 250 nm.

A slow axis of the first reactive mesogen layer 24 is orthogonal to a slow axis of the second reactive mesogen layer 25. Here, the term "orthogonal" preferably means that an angle formed by the two slow axes is 90° (completely orthogonal), but this angle may be 87° to 93° (substantially orthogonal).

In the present specification, the in-plane retardation of the first reactive mesogen layer 24 for light having a wavelength of $\lambda$ nm is defined as "$R1(\lambda)$", and its absolute value is defined as "$|R1(\lambda)|$". The in-plane retardation of the second reactive mesogen layer 25 for light having a wavelength of $\lambda$ nm is defined as "$R2(\lambda)$", and its absolute value is defined as "$|R2(\lambda)|$".

The second reactive mesogen layer 25 is preferably a positive wavelength dispersibility retardation layer satisfying the following formula:

$$|R2(450)| > |R2(550)| > |R2(650)|$$

The second reactive mesogen layer 25 preferably satisfies the following formula:

$$1.05 < R2(450)/R2(550) \leq 1.2$$

In the second reactive mesogen layer 25, R2(650)/R2(550) is preferably 0.85 to 0.99.

The first reactive mesogen layer 24 preferably has smaller wavelength dispersibility than the second reactive mesogen layer 25, and specifically, is preferably a flat wavelength dispersibility retardation layer, and the following formula is preferably satisfied:

$$1.01 \leq R1(450)/R1(550) \leq 1.05$$

In the first reactive mesogen layer 24, R1(650)/R1(550) is preferably 0.85 to 1.00.

The first reactive mesogen layer 24 and the second reactive mesogen layer 25 preferably satisfy a relationship represented by the following formula:

$$|R2(550)| - |R1(550)| > |R2(450)| - |R1(450)|$$

$$|R2(650)| - |R1(650)| > |R2(550)| - |R1(550)|$$

The $|R2(450)| - |R1(450)|$ is preferably 90 to 135 nm. The $|R2(550)| - |R1(550)|$ is preferably 115 to 160 nm. The $|R2(650)| - |R1(650)|$ is preferably 140 to 185 nm.

The first reactive mesogen layer 24 and the second reactive mesogen layer 25 can be formed, for example, by applying polymerizable liquid crystal onto a base alignment film undergone alignment treatment and curing the polymerizable liquid crystal by baking, ultraviolet light irradiation, or the like.

As the base alignment film, a film generally used in the field of liquid crystal display panels, such as a polyimide film, can be used. An alignment film can be formed by applying a solution onto a base material and curing the solution by baking, light irradiation, or the like. Examples of the alignment treatment for the alignment film include rubbing and light irradiation.

The first reactive mesogen layer 24 and the second reactive mesogen layer 25 have different material wavelength dispersibilities, and it is preferable that one satisfy $1.01 \leq Re(450)/Re(550) \leq 1.05$ and the other satisfy $1.05 < Re(450)/Re(550) \leq 1.2$.

As the polymerizable liquid crystal used in the first reactive mesogen layer 24 and the second reactive mesogen layer 25, a liquid crystal polymer having a photoreactive group is preferably used. Examples of the liquid crystalline polymer include polymers having in their main chain a structure of acrylate, methacrylate, maleimide, N-phenyl maleimide, siloxane, or the like and having a side chain with a structure having both substituents (mesogen groups) such as biphenyl group, terphenyl group, naphthalene group, phenylbenzoate group, azobenzene group, and derivatives thereof and photoreactive groups such as cinnamoyl group, chalcone group, cinnamylidene group, β-(2-phenyl) acryloyl group, cinnamic acid group, and derivatives thereof. Such a polymer may be a homopolymer consisting of a single repeating unit, or a copolymer consisting of two or more repeating units having different side chain structures. Such a copolymer includes any of an alternating type, a random type, a graft type and the like. In each copolymer, a side chain of at least one repeating unit has a mesogen group and a photoreactive group such as those described above together, but a side chain of another repeating unit may contain no mesogen group or no photoreactive group.

The polymerizable liquid crystal may contain an additive such as a photopolymerization initiator. The photopolymerization initiator is not limited, and a conventionally known photopolymerization initiator can be used.

Examples of the solvent used for application of the polymerizable liquid crystal include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxybutyl acetate, N-methylpyrrolidone, and dimethylacetamide. One of these solvents may be used alone, or two or more thereof may be used in combination.

The first reactive mesogen layer 24 and the second reactive mesogen layer 25 can be formed, for example, by the following method. First, a base alignment film is formed on the color filter layer 23, and alignment treatment such as rubbing and light irradiation is performed to determine an alignment azimuth. Polymerizable liquid crystal is applied onto the base alignment film undergone alignment treatment and cured by baking, ultraviolet light irradiation, or the like. A coater such as a slit coater or a spin coater can be suitably used for applying the polymerizable liquid crystal. The polymerizable liquid crystal is applied with a uniform thickness and then pre-baked at a temperature of about 70° C. to 100° C. for 2 minutes. Thereafter, photo-curing treatment is performed using an exposure device that irradiates light (ultraviolet light) having a wavelength of 313 to 365 nm.

The cured polymerizable liquid crystal aligns along the alignment azimuth of the base alignment film and functions as a retardation layer. The retardation of the retardation layer is generally determined by a product of the birefringence θn of the polymerizable liquid crystal and the thickness d of the retardation layer.

When the polymerizable liquid crystal itself is a material that induces alignment by irradiation with polarized ultraviolet light or the like, formation of the base alignment film can be omitted.

As a method of forming the first reactive mesogen layer 24 and the second reactive mesogen layer 25, a method may be used of applying polymerizable liquid crystal onto a base film such as a PET film to form a film and then transferring the obtained film to the color filter layer 23 via an adhesive (pressure-sensitive adhesive or adhesive bond). In this case, an adhesive layer is disposed adjacent to the viewing surface side of the first reactive mesogen layer 24.

In the present embodiment, in a step of curing the first reactive mesogen layer 24 with ultraviolet light, the illuminance of ultraviolet light is set in a range of 40 to 90 mW/cm$^2$. This makes it possible to achieve both good long-term reliability (conditions: 60° C. 90% RH and 85° C. dry) and excellent low reflection characteristics. As the illuminance of ultraviolet light, a value integrated on a nanometer basis can be used in a range of the wavelength 355 to 375 nm.

Figure 2:
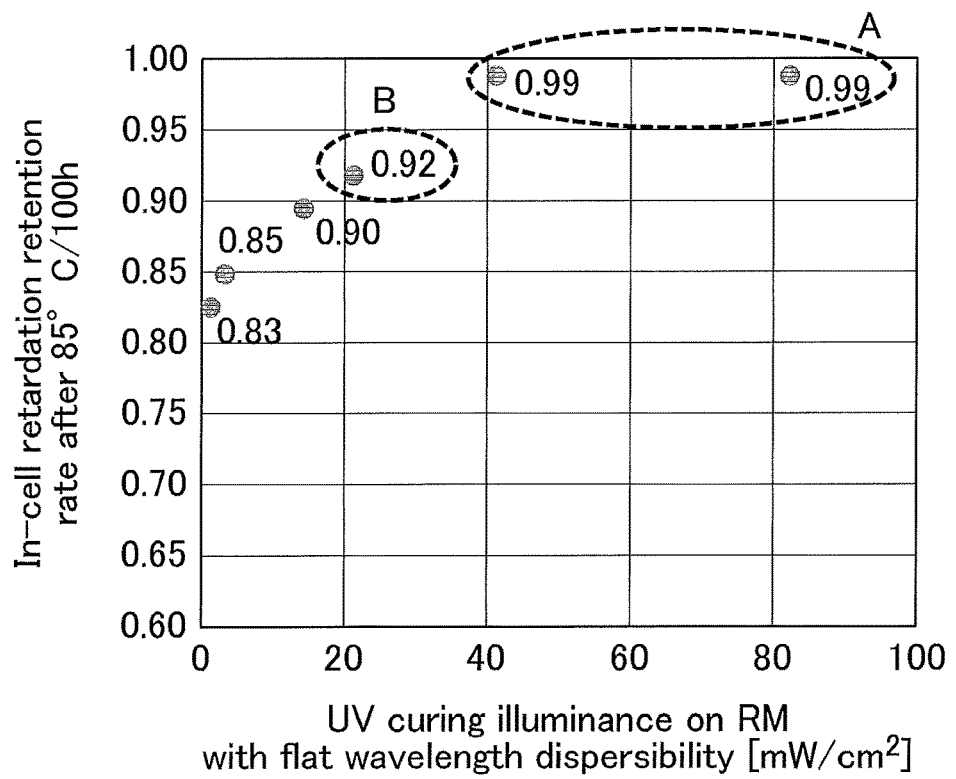
FIG. 2 is a graph showing a relationship between ultraviolet illuminance and a retardation retention rate after a high-temperature test in a step of curing a reactive mesogen layer with ultraviolet light.

According to the study of the present inventors, when subjected to a high-temperature and high-humidity test (condition: 60° C. 90% RH, 1000 hours), if the reactive mesogen layer at an outer peripheral portion of the liquid crystal panel is deteriorated by moisture entering from the liquid crystal layer 30, the retardation of the reactive mesogen layer is reduced, and the retardation between the in-cell retardation layer and the out-cell retardation layer 60 is mismatched. As a result, in black display of the liquid crystal panel, a display defect occurs in which the outer peripheral portion is whitened. Even in a high-temperature test (condition: 85° C. dry, 1000 hours), a similar display defect occurs, although the degree is different. In contrast, the present inventors have found that display defects in a high-temperature and high-humidity test and a high-temperature test can be prevented by increasing ultraviolet illuminance in the step of curing the reactive mesogen layer with ultraviolet light. FIG. 2 is a graph showing a relationship between the ultraviolet illuminance and a retardation retention rate after a high-temperature test in the step of curing the reactive mesogen layer with ultraviolet light. In a region A in FIG. 2, good heat resistance is obtained. However, in a region B, the retardation is greatly reduced.

Since a flat wavelength dispersibility retardation layer tends to have lower water resistance than a positive wavelength dispersibility retardation layer, when the first reactive mesogen layer 24 is the flat wavelength dispersibility retardation layer, in the step of curing the first reactive mesogen layer 24 with ultraviolet light, the ultraviolet illuminance is preferably in a range of 40 to 90 mW/cm$^2$.

The first alignment film 41 and the second alignment film 21 have a function of controlling alignment of liquid crystal molecules included in the liquid crystal layer 30, and when a voltage applied to the liquid crystal layer 30 is less than a threshold voltage (including no voltage application), the major axis of the liquid crystal molecules in the liquid crystal layer 30 is controlled to align horizontally to the first alignment film 41 and the second alignment film 21 by the functions of the first alignment film 41 and the second alignment film 21. The first alignment film 41 and the second alignment film 21 are layers undergone alignment treatment for controlling alignment of liquid crystal, and an alignment film generally used in the field of liquid crystal display devices such as polyimide can be used. Examples of the material of the first alignment film 41 and the second alignment film 21 include a polymer having a main chain such as polyimide, polyamic acid, and polysiloxane, and a photo-alignment film material having a photoreactive site (functional group) in the main chain or side chain is suitably used.

The liquid crystal layer 30 contains liquid crystal molecules horizontally aligned during no voltage application, and a voltage is applied to the liquid crystal layer 30 to change an alignment state of the liquid crystal molecules according to the applied voltage, and thus to control the amount of light transmission. The liquid crystal molecules in the liquid crystal layer 30 are horizontally aligned by a restraining force of the first alignment film 41 and the second alignment film 21 when no voltage is applied between a pair of electrodes provided in the TFT layer 42 (during no voltage application). When a voltage is applied between the pair of electrodes (during voltage application), the liquid crystal molecules rotate in an in-plane direction according to a transverse electric field generated in the liquid crystal layer 30. The thickness of the liquid crystal layer 30 is defined by a spacer 31.

The liquid crystal molecules may have positive or negative value for the anisotropy of dielectric constant (Δε) defined by the following formula:

$$\Delta\varepsilon = \text{(dielectric constant in the major axis direction)} - \text{(dielectric constant in the minor axis direction)}$$

The TFT layer 42 is a layer including a thin-film transistor (TFT), which is a switching element used to switch on/off of a pixel of the liquid crystal display device, and includes wirings and electrodes connected to the TFT, insulating films to electrically separate the wirings and the electrodes, and the like.

Examples of the liquid crystal drive mode of the liquid crystal display device of the present embodiment include transverse electric field modes such as a fringe field switching (FFS) mode and an in-plane switching (IPS) mode. As the TFT layer 42 for transverse electric field mode, the TFT layer including a pair of electrodes that generate a transverse electric field in the liquid crystal layer 30 by applying voltage is preferable.

In the FFS mode, the TFT layer 42 includes, on the surface of the first transparent base material 43 on a side toward the liquid crystal layer 30, a common electrode (planar electrode), an insulating film covering the common electrode, and a pixel electrode (interdigital electrode) disposed on the surface of the insulating film on a side toward the liquid crystal layer 30. According to such a configuration, a transverse electric field (fringe electric field) can be generated in the liquid crystal layer 30 by applying voltage between the common electrode and the pixel electrode constituting the pair of electrodes. Thus, the alignment of the liquid crystal in the liquid crystal layer 30 can be controlled by adjusting the voltage applied between the common electrode and the pixel electrode. The pixel electrodes include a red pixel electrode, a green pixel electrode, and a blue pixel electrode so that the amount of color light transmitted through the red color filter 23R, the green color filter 23G, and the blue color filter 23B can be individually controlled.

Examples of the material of the common electrode and the pixel electrode include indium tin oxide (ITO) and indium zinc oxide (IZO). Examples of the material of the insulating film include an organic insulating film and a nitride film.

In the IPS mode, the TFT layer 42 includes a combination of an interdigital electrode for a common electrode and an interdigital electrode for a pixel electrode as a pair of electrodes. The transverse electric field is generated in the liquid crystal layer 30 by applying a voltage between the pair of interdigital electrodes, and the alignment of the liquid crystal molecules in the liquid crystal layer 30 can be controlled.

The liquid crystal display device of the present embodiment may include other components. For example, by providing an antireflection film on the viewing surface side of the first linearly polarizing plate 51, internal reflection of the liquid crystal display device can be further reduced. As the antireflection film, a moth-eye film having a moth-eye surface structure is preferably used.

A transparent electrode may be provided on the viewing surface side of the second transparent base material 22. By providing such a transparent electrode, defects due to charging can be prevented. A sensor of a touch panel may be provided on the viewing surface side of the second transparent base material 22.

The present invention is described below in more detail based on Examples and Comparative Examples. The examples, however, are not intended to limit the scope of the present invention.

Example 1

A liquid crystal panel of Example 1 has the configuration shown in FIG. 1. The in-cell retardation layer of Example 1 includes a four-layer structure having a first base alignment film (not shown), the first reactive mesogen (RM) layer 24, a second base alignment film (not shown), and the second reactive mesogen (RM) layer 25. Each of the first base alignment film and the second base alignment film is a polyimide film undergone alignment treatment. The first reactive mesogen layer 24 is a retardation layer showing flat wavelength dispersibility, and specifically has characteristics of Re(550)=400 nm and Re(450)/Re(550)=1.03. The second reactive mesogen layer 25 is a retardation layer showing positive wavelength dispersibility, and specifically has characteristics of Re(550)=260 nm and Re(450)/Re(550)=1.10. When the transmission axis of the second linearly polarizing plate 52 is defined as 0° azimuth, the slow axis of the first reactive mesogen layer 24 is +45° azimuth, and the slow axis of the second reactive mesogen layer 25 is −45° azimuth. The slow axis of the first reactive mesogen layer 24 and the slow axis of the second reactive mesogen layer 25 are orthogonal to each other. By such a combination of the first reactive mesogen layer 24 and the second reactive mesogen layer 25, a λ/4 plate with a wide viewing angle showing reverse wavelength dispersibility is obtained, and specifically, such characteristics that Re(550)=140 nm and Re(450)/Re(550)=0.90 are obtained.

Both the first reactive mesogen layer 24 and the second reactive mesogen layer 25 can be formed of polymerizable liquid crystal. An in-cell retardation layer of Example 1 was produced by the following method.

(Step 1)
After an alignment film composition exhibiting a photo-alignment property was applied onto the color filter layer 23, a photo-alignment treatment by polarized ultraviolet irradiation was performed to form the first base alignment film.

(Step 2)
Reactive mesogen (polymerizable liquid crystal) formed of an acrylic monomer was applied onto the first base alignment film, and cured by irradiating it with polarized ultraviolet light having a main wavelength of 365 nm to form the first reactive mesogen layer 24. The illuminance of the ultraviolet light applied to the polymerizable liquid crystal was 40 mW/cm².

(Step 3)
After an alignment film composition exhibiting a photo-alignment property was applied onto the first reactive mesogen layer 24, a photo-alignment treatment by polarized ultraviolet irradiation was performed to form the second base alignment film.

(Step 4)
Polymerizable liquid crystal was applied onto the second base alignment film and cured to form the second reactive mesogen layer 25. The illuminance of the ultraviolet light applied to the polymerizable liquid crystal was 20 mW/cm².

According to the above process, a laminated in-cell retardation layer including the first base alignment film, the first reactive mesogen layer 24, the second base alignment film, and the second reactive mesogen layer 25 was completed.

Comparative Example 1

Figure 3:
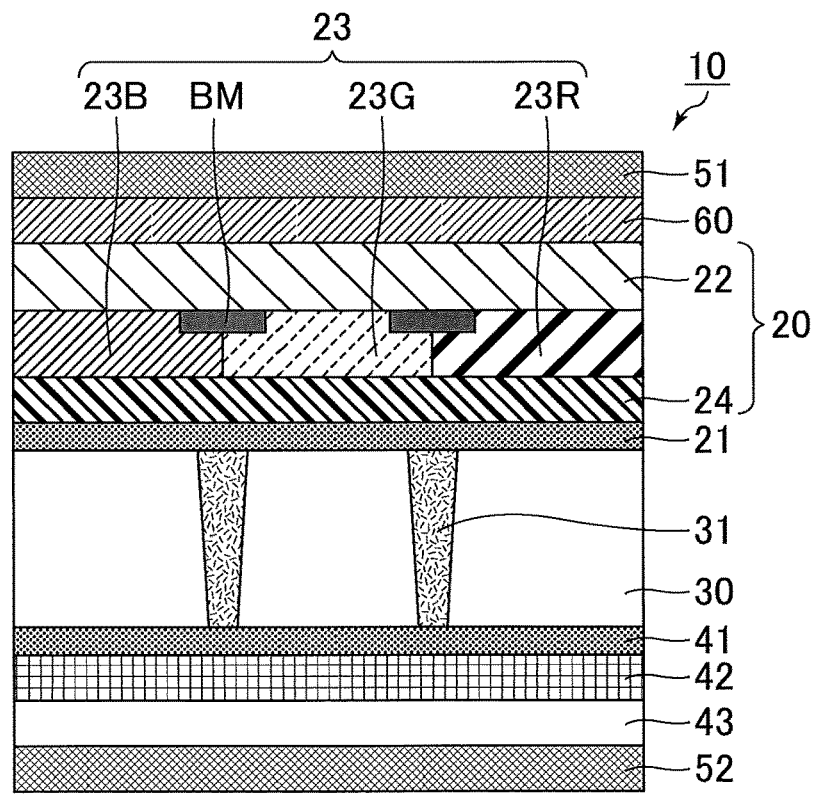
FIG. 3 is a schematic cross-sectional view showing a liquid crystal panel of Comparative Example 1.

FIG. 3 is a schematic cross-sectional view showing a liquid crystal panel of Comparative Example 1. An in-cell retardation layer of Comparative Example 1 has a two-layer structure having a first base alignment film (not shown) and the first reactive mesogen layer 24. The first reactive mesogen layer 24 is a retardation layer showing flat wavelength dispersibility, and specifically has characteristics of Re(550)= 140 nm and Re(450)/Re(550)=1.03. When the transmission axis of the second linearly polarizing plate 52 is defined as 0° azimuth, the slow axis of the first reactive mesogen layer 24 is +45° azimuth. In Comparative Example 1, when the first reactive mesogen layer 24 is formed, the illuminance of the ultraviolet light applied to the polymerizable liquid crystal was set to 20 mW/cm².

Comparative Example 2

Figure 4:
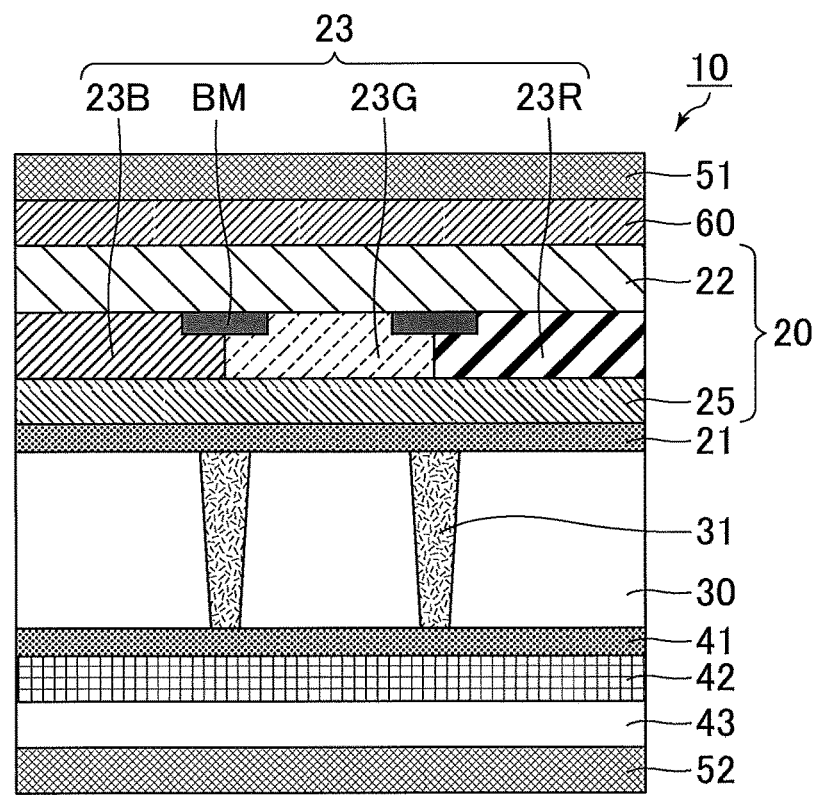
FIG. 4 is a schematic cross-sectional view showing a liquid crystal panel of Comparative Example 2.

FIG. 4 is a schematic cross-sectional view showing a liquid crystal panel of Comparative Example 2. An in-cell retardation layer of Comparative Example 2 has a two-layer structure having a first base alignment film (not shown) and the first reactive mesogen layer 24. The first reactive mesogen layer 24 is a retardation layer showing positive wavelength dispersibility, and specifically has characteristics of Re(550)=140 nm and Re(450)/Re(550)=1.10. When the transmission axis of the second linearly polarizing plate 52 is defined as 0° azimuth, the slow axis of the first reactive mesogen layer 24 is +45° azimuth. In Comparative Example 2, when the first reactive mesogen layer 24 is formed, the illuminance of the ultraviolet light applied to the polymerizable liquid crystal was set to 20 mW/cm².

Comparative Example 3

A liquid crystal panel of Comparative Example 3 has the configuration shown in FIG. 1. The in-cell retardation layer of Comparative Example 3 includes a four-layer structure having a first base alignment film (not shown), the first reactive mesogen layer 24, a second base alignment film (not shown), and the second reactive mesogen layer 25. The first reactive mesogen layer 24 is a retardation layer showing positive wavelength dispersibility, and specifically has characteristics of Re(550)=160 nm and Re(450)/Re(550)=1.10. The second reactive mesogen layer 25 is a retardation layer showing flat wavelength dispersibility, and specifically has characteristics of Re(550)=300 nm and Re(450)/Re(550)= 1.03. When the transmission axis of the second linearly polarizing plate 52 is defined as 0° azimuth, the slow axis of the first reactive mesogen layer 24 is +45° azimuth, and the slow axis of the second reactive mesogen layer 25 is −45° azimuth. The slow axis of the first reactive mesogen layer 24 and the slow axis of the second reactive mesogen layer 25 are orthogonal to each other. By such a combination of the first reactive mesogen layer 24 and the second reactive mesogen layer 25, a λ/4 plate with a wide viewing angle showing reverse wavelength dispersibility is obtained, and specifically, such characteristics that Re(550)=140 nm and Re(450)/Re(550)=0.95 are obtained. While the retardation and the slow axis of the in-cell retardation layer are 140 nm (=300 nm−160 nm) and −45° azimuth, the retardation and the slow axis of the out-cell retardation layer 60 are designed to be 140 nm and +45° azimuth, so that a relationship is established in which the in-cell retardation layer and the out-cell retardation layer 60 mutually conduct retardation compensation. Such a design is applied to the two-layer in-cell retardation layers of Examples and Comparative Examples.

In Comparative Example 3, in Step 2 of forming the first reactive mesogen layer 24, the illuminance of ultraviolet light applied to polymerizable liquid crystal was set to 20 mW/cm², and in Step 4 of forming the second reactive mesogen layer 25, the illuminance of ultraviolet light applied to polymerizable liquid crystal was set to 20 mW/cm².

Comparative Example 4

A liquid crystal panel of Comparative Example 4 has the configuration shown in FIG. 1. The in-cell retardation layer of Comparative Example 4 includes a four-layer structure having a first base alignment film (not shown), the first reactive mesogen layer 24, a second base alignment film (not shown), and the second reactive mesogen layer 25. The first reactive mesogen layer 24 is a retardation layer showing flat wavelength dispersibility, and specifically has characteristics of Re(550)=300 nm and Re(450)/Re(550)=1.03. The second reactive mesogen layer 25 is a retardation layer showing positive wavelength dispersibility, and specifically has characteristics of Re(550)=160 nm and Re(450)/Re(550)= 1.10. When the transmission axis of the second linearly polarizing plate 52 is defined as 0° azimuth, the slow axis of the first reactive mesogen layer 24 is +45° azimuth, and the slow axis of the second reactive mesogen layer 25 is −45° azimuth. The slow axis of the first reactive mesogen layer 24 and the slow axis of the second reactive mesogen layer 25 are orthogonal to each other. By such a combination of the first reactive mesogen layer 24 and the second reactive mesogen layer 25, a λ/4 plate with a wide viewing angle showing reverse wavelength dispersibility is obtained, and specifically, such characteristics that Re(550)=140 nm and Re(450)/Re(550)=0.95 are obtained.

In Comparative Example 4, in Step 2 of forming the first reactive mesogen layer 24, the illuminance of ultraviolet light applied to polymerizable liquid crystal was set to 20 mW/cm², and in Step 4 of forming the second reactive mesogen layer 25, the illuminance of ultraviolet light applied to polymerizable liquid crystal was set to 20 mW/cm².

Example 2 and Comparative Examples 5 and 6

In Example 2 and Comparative Examples 5 and 6, a liquid crystal panel was produced in the same manner as in Example 1, except that in Step 2 of forming the first reactive mesogen layer 24, the illuminance of ultraviolet light applied to polymerizable liquid crystal was changed as shown in Table 1 below.

TABLE 1

| | | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| Structure of liquid crystal panel | | FIG. 1 | FIG. 1 | FIG. 2 | FIG. 3 | FIG. 1 | FIG. 1 | FIG. 1 | FIG. 1 |
| First RM layer | Wavelength dispersibility | Flat | Flat | Flat | Positive | Positive | Flat | Flat | Flat |
| | Re(450)/Re(550) | 1.03 | 1.03 | 1.03 | 1.1 | 1.1 | 1.03 | 1.03 | 1.03 |
| | UV illuminance (mW/cm²) | 40 | 90 | 20 | 20 | 20 | 20 | 20 | 120 |
| | Retardation (nm) at 550 nm | 400 | 400 | 140 | 140 | 160 | 300 | 400 | 400 |
| Second RM layer | Wavelength dispersibility | Positive | Positive | Absent | Absent | Flat | Positive | Positive | Positive |
| | Re(450)/Re(550) | 1.1 | 1.1 | | | 1.03 | 1.1 | 1.1 | 1.1 |
| | UV illuminance (mW/cm²) | 20 | 20 | | | 20 | 20 | 20 | 20 |
| | Retardation (nm) at 550 nm | 260 | 260 | | | 300 | 160 | 260 | 260 |
| In-cell retardation layer | Re(450)/Re(550) | 0.9 | 0.9 | 1.03 | 1.1 | 0.95 | 0.95 | 0.9 | 0.9 |
| | Retardation (nm) at 550 nm | 140 | 140 | 140 | 140 | 140 | 140 | 140 | 140 |

<Evaluation Test>

Figure 5:
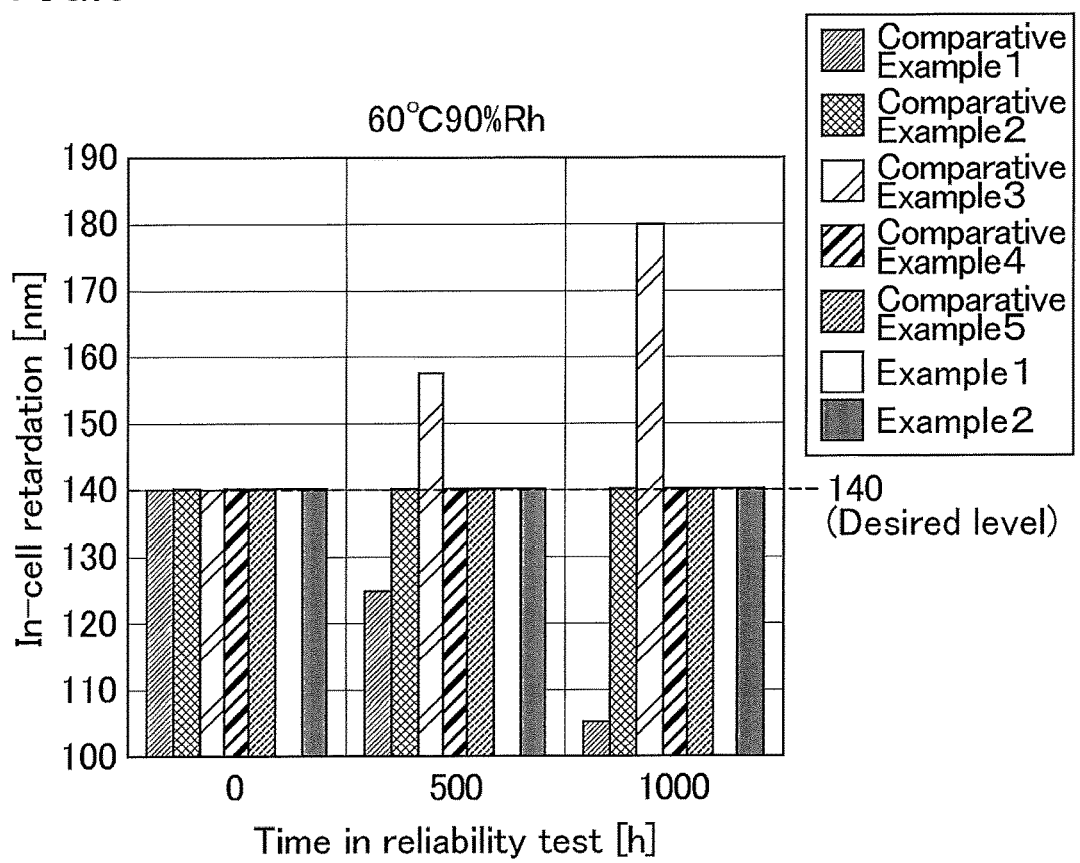
FIG. 5 is a graph showing changes in retardation values according to a high-temperature and high-humidity test (60° C., 90% RH) in in-cell retardation layers of Examples and Comparative Examples.
Figure 6:
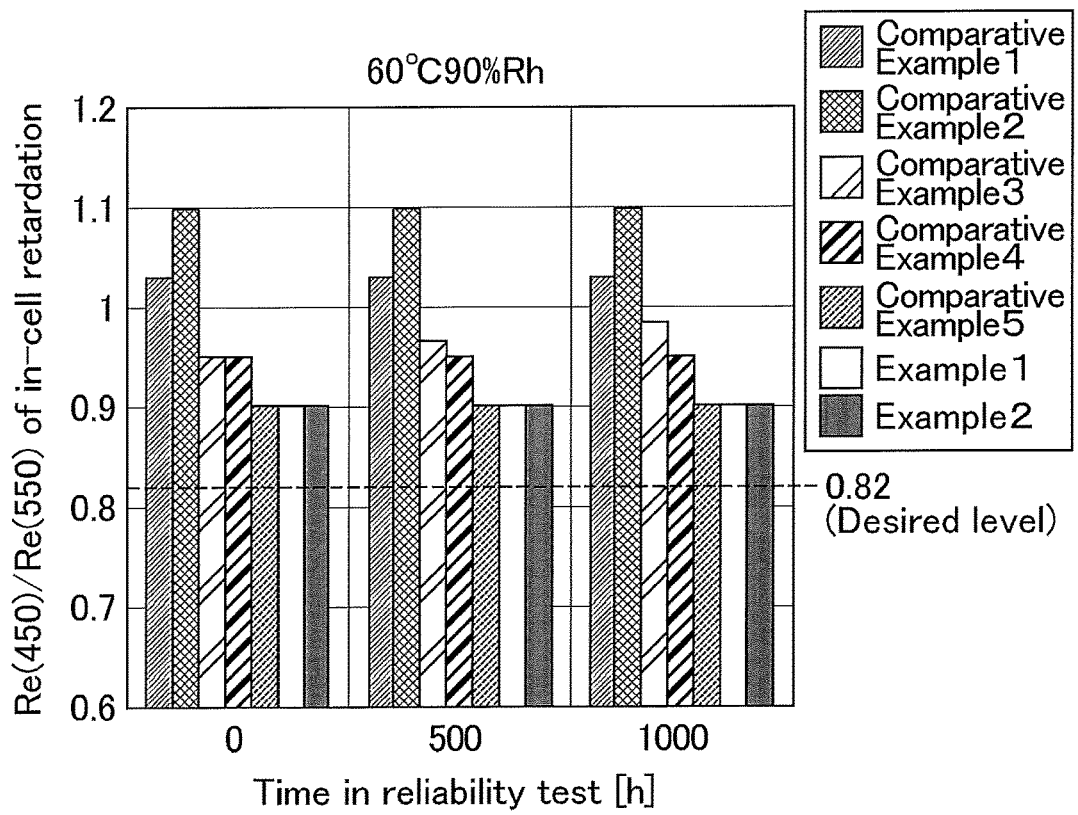
FIG. 6 is a graph showing changes in wavelength dispersibility of retardation on a short wavelength side according to the high-temperature and high-humidity test (60° C., 90% RH) in the in-cell retardation layers of Examples and Comparative Examples.
Figure 7:
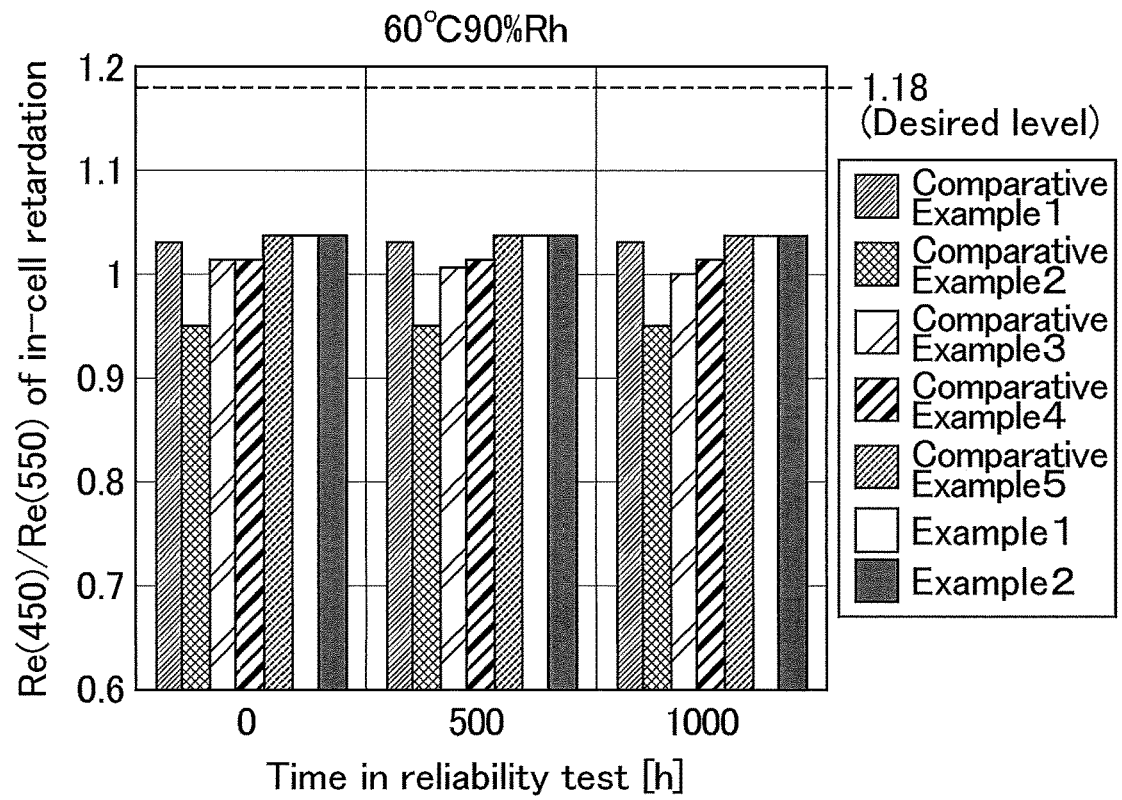
FIG. 7 is a graph showing changes in wavelength dispersibility of retardation on a long wavelength side according to the high-temperature and high-humidity test (60° C., 90% RH) in the in-cell retardation layers of Examples and Comparative Examples.

(1) The liquid crystal panels produced in Examples and Comparative Examples were placed in a high-temperature and high-humidity environment at 60° C. and 90% RH for 1000 hours, and a change in retardation of the in-cell retardation layer was confirmed. The results are shown in Table 2 below and FIGS. 5 to 7. FIG. 5 is a graph showing changes in retardation values according to a high-temperature and high-humidity test (60° C., 90% RH) in the in-cell retardation layers of Examples and Comparative Examples. FIG. 6 is a graph showing changes in wavelength dispersibility of retardation on a short wavelength side according to the high-temperature and high-humidity test (60° C., 90% RH) in the in-cell retardation layers of Examples and Comparative Examples. FIG. 7 is a graph showing changes in wavelength dispersibility of retardation on a long wavelength side according to the high-temperature and high-humidity test (60° C., 90% RH) in the in-cell retardation layers of Examples and Comparative Examples.

TABLE 2

| 60° C. 90% RH test | | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| First RM layer | Retardation (nm) at 550 nm | 400 | 400 | 105 | 140 | 120 | 300 | 400 | 400 |
| Second RM layer | Retardation (nm) at 550 nm | 260 | 260 | — | — | 300 | 160 | 260 | 260 |
| In-cell retardation layer | Re(450)/Re(550) | 0.9 | 0.9 | 1.03 | 1.1 | 0.98 | 0.95 | 0.9 | 0.9 |
| | Retardation (nm) at 550 nm | 140 | 140 | 105 | 140 | 180 | 140 | 140 | 140 |

Most of the moisture in the air in a 90% RH environment enters the liquid crystal panel from the liquid crystal layer and diffuses toward the in-cell retardation layer. As a result, in the in-cell retardation layer of Comparative Example 1 constituted of flat wavelength dispersion reactive mesogen, the retardation was significantly reduced after 1000 hours (140 nm→105 nm). Thus, the retardation (140 nm) of the out-cell retardation layer cannot be canceled, so that a display quality of the liquid crystal panel is reduced.

Similarly, in the in-cell retardation layer of Comparative Example 3, the retardation of flat wavelength dispersion reactive mesogen constituting the second reactive mesogen layer was significantly reduced (160 nm→120 nm). As a result, a retardation of the in-cell retardation layer obtained by subtracting the retardation (300 nm) of the second reactive mesogen layer from the retardation (300 nm) of the first reactive mesogen layer was 180 nm, which was significantly deviated from the retardation (140 nm) before the high-temperature and high-humidity test.

On the other hand, in Examples 1 and 2 and Comparative Examples 4 to 6, since the second reactive mesogen layer 25 on a side in contact with the liquid crystal layer was positive wavelength dispersion reactive mesogen resistant to moisture, water did not reach flat wavelength dispersion reactive mesogen, and the retardation of the flat wavelength dispersion reactive mesogen was not reduced. Therefore, in the in-cell retardation layers of Examples 1 and 2 and Comparative Examples 4 to 6, the retardation did not change before and after the high-temperature and high-humidity test.

Figure 8:
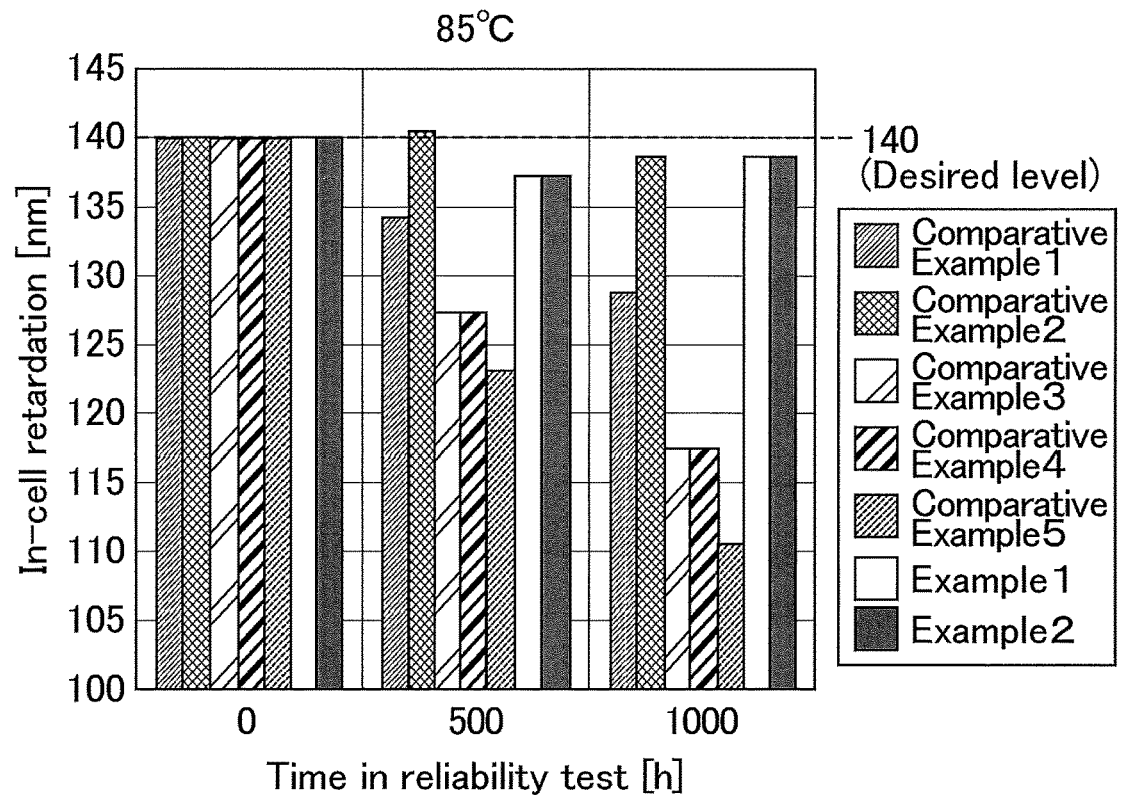
FIG. 8 is a graph showing changes in retardation values according to a high-temperature test (85° C.) in the in-cell retardation layers of Examples and Comparative Examples.
Figure 9:
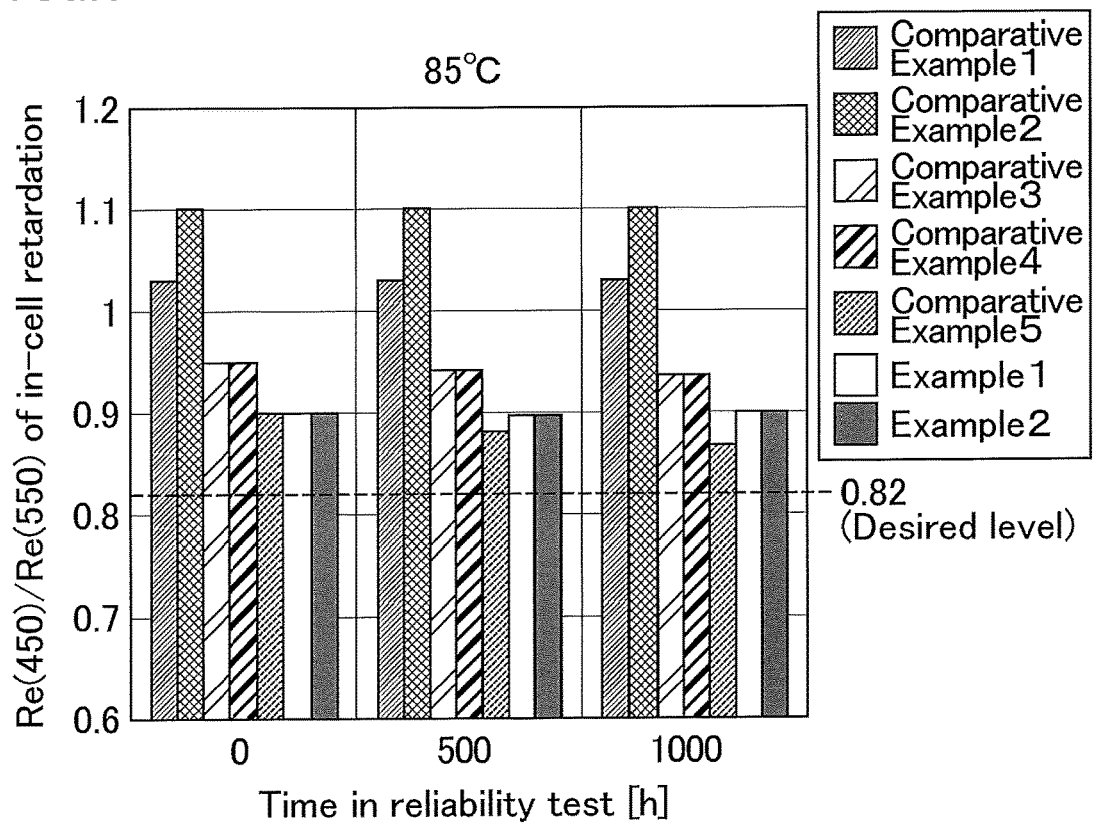
FIG. 9 is a graph showing changes in wavelength dispersibility of retardation on the short wavelength side according to the high-temperature test (85° C.) in the in-cell retardation layers of Examples and Comparative Examples.
Figure 10:
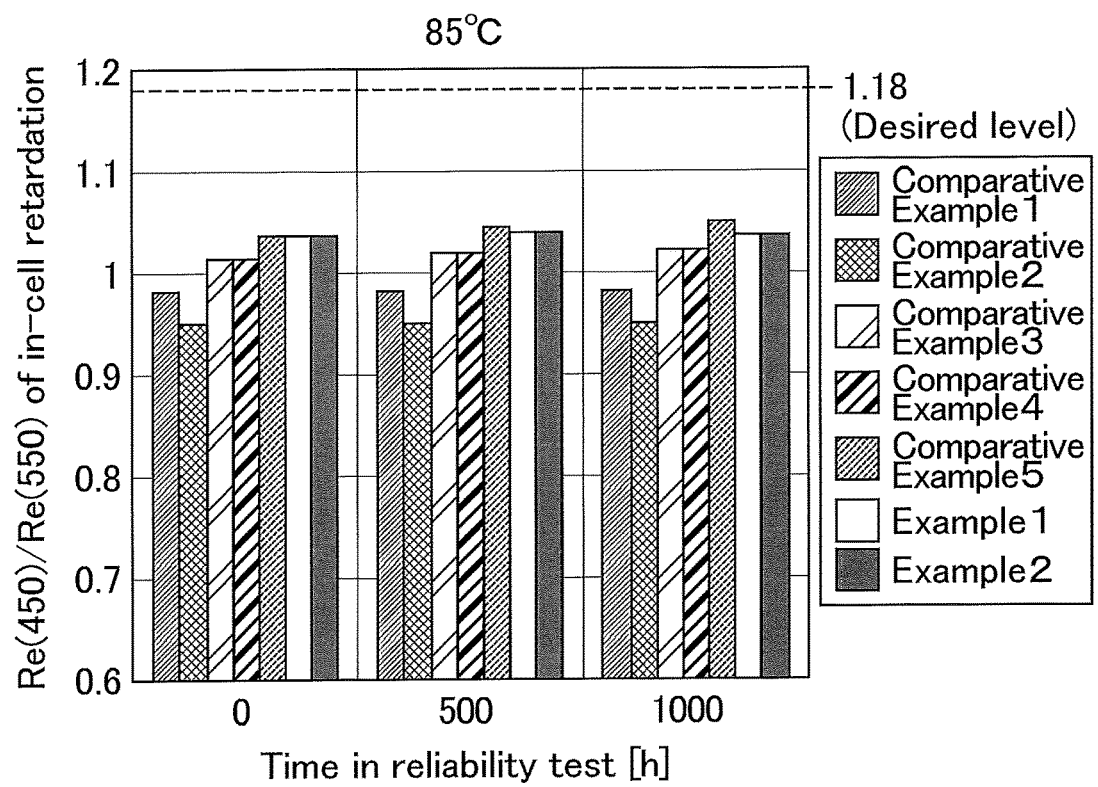
FIG. 10 is a graph showing changes in wavelength dispersibility of retardation on the long wavelength side according to the high-temperature test (85° C.) in the in-cell retardation layers of Examples and Comparative Examples.

(2) The liquid crystal panels produced in Examples and Comparative Examples were placed in a high-temperature environment at 85° C. for 1000 hours, and a change in retardation of the in-cell retardation layer was confirmed. The results are shown in Table 3 below and FIGS. 8 to 10. FIG. 8 is a graph showing changes in retardation values according to a high-temperature test (85° C.) in the in-cell retardation layers of Examples and Comparative Examples. FIG. 9 is a graph showing changes in wavelength dispersibility of retardation on the short wavelength side according to the high-temperature test (85° C.) in the in-cell retardation layers of Examples and Comparative Examples. FIG. 10 is a graph showing changes in wavelength dispersibility of retardation on the long wavelength side according to the high-temperature test (85° C.) in the in-cell retardation layers of Examples and Comparative Examples.

TABLE 3

| 85° C. test | | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| First RM layer | Retardation (nm) at 550 nm | 396 | 396 | 129 | 139 | 158 | 276 | 364 | 396 |
| Second RM layer | Retardation (nm) at 550 nm | 257 | 257 | — | — | 276 | 158 | 258 | 257 |
| In-cell retardation layer | Re(450)/Re(550) | 0.87 | 0.9 | 1.03 | 1.1 | 0.94 | 0.94 | 0.9 | 0.9 |
| | Retardation (nm) at 550 nm | 139 | 139 | 129 | 139 | 118 | 118 | 111 | 139 |

The flat wavelength dispersion reactive mesogen has low heat resistance, and in the in-cell retardation layer of Comparative Example 1 constituted of the flat wavelength dispersion reactive mesogen, the retardation was significantly reduced after 1000 hours (140 nm→129 nm). Similarly, in the in-cell retardation layers of Comparative Examples 3 to 5, the retardation of the flat wavelength dispersion reactive mesogen was significantly reduced, and as a result, the retardation of the in-cell retardation layer was significantly deviated from the retardation (140 nm) before the high-temperature test.

On the other hand, in Examples 1 and 2, since the illuminance at the time of curing the flat wavelength dispersion reactive mesogen was increased, heat resistance of the in-cell retardation layer could be improved. Therefore, in the in-cell retardation layers of Examples 1 and 2, the retardation did not change before and after the high-temperature test.

(3) The liquid crystal display devices incorporating the liquid crystal panels of Examples 0.1 and 2 and Comparative Example 6 were placed in a constant temperature bath at 70° C., and with a backlight turned on, a voltage of 5 V was continued to be applied at a frequency of 60 Hz. Initially and after 1000 hours, a voltage of 1 V was applied at a frequency of 1 Hz to measure the voltage holding ratio (VHR), and a change with time of the voltage holding ratio was confirmed. The obtained results are shown in Table 4.

TABLE 4

| VHR test | Example 1 | Example 2 | Comparative Example 6 |
|---|---|---|---|
| Initial stage | 94% | 94% | 92% |
| After 1000 hrs | 92% | 90% | 84% |

The liquid crystal panels of Examples 1 and 2 had a voltage holding ratio of 90% or more after 1000 hours, whereas the liquid crystal panel of Comparative Example 6 had a low voltage holding ratio of 84% after 1000 hours. In Comparative Example 6, it was presumed that the illuminance at the time of curing the reactive mesogen was too high, so that impurities were generated from the color filter layer, the base alignment film, and the like, causing a reduction in the voltage holding ratio.

(4) Summary of Evaluation Results

As described above, in the in-cell retardation layers of Examples 1 and 2, the retardation did not change in both the high-temperature and high-humidity test at 60° C. and 90% RH for 0.1000 hours and in the high-temperature test at 85° C. for 1000 hours, and the obtained wavelength dispersibility was close to the design target (Re(450)/Re(550)=0.82, Re(650)/Re(550)=1.18). On the other hand, in the in-cell retardation layers of Comparative Examples 1 and 3, the retardation changed in both the high-temperature and high-humidity test and the high-temperature test. In the in-cell retardation layer of Comparative Example 2, although the retardation did not change in both the high-temperature and high-humidity test and the high-temperature test, the wavelength dispersibility was significantly deviated from the design target, and anti-reflective properties were poor. In the in-cell retardation layers of Comparative Examples 4 and 5, although the retardation did not change in the high-temperature and high-humidity test, the retardation changed in the high-temperature test.

The in-cell retardation layer of Comparative Example 6, the retardation did not change in both the high-temperature and high-humidity test and the high-temperature test, and the wavelength dispersibility was close to the design target. However, the voltage holding ratio (VHR) was less than 90% after 1000 hours, and display defects such as image sticking were likely to occur.

What is claimed is:

1. A liquid crystal panel produced by a method for producing the liquid crystal panel,
   the method comprising curing a first reactive mesogen layer with ultraviolet light at an illuminance within a range of 40 to 90 mW/cm$^2$,
   the liquid crystal panel including:
   a first transparent base material,
   a TFT layer and a first alignment film stacked in order on the first transparent base material,
   a second transparent base material,
   a color filter layer, an in-cell retardation layer, and a second alignment film stacked in order on the second transparent base material,
   a liquid crystal layer sandwiched between the first alignment film and the second alignment film,
   an out-cell retardation layer disposed on a side opposite to a color filter layer side of the second transparent base material, and
   a pair of linearly polarizing plates arranged so as to sandwich the first transparent base material and the out-cell retardation layer and having transmission axes orthogonal to each other,
   the in-cell retardation layer including the first reactive mesogen layer and a second reactive mesogen layer,
   the first reactive mesogen layer and the second reactive mesogen layer having different material wavelength dispersibilities and having slow axes arranged orthogonal to each other,
   wherein the first reactive mesogen layer satisfies the following formula (1) and the second reactive mesogen layer satisfies the following formula (2):

$1.01 \leq Re(450)/Re(550) \leq 1.05$ (1)

$1.05 < Re(450)/Re(550) \leq 1.2$ (2)

wherein Re(450) represents an in-plane retardation for light having a wavelength of 450 nm and Re(550) represents an in-plane retardation for light having a wavelength of 550 nm.

2. The liquid crystal panel according to claim 1,
   wherein at least one of organic layer and/or inorganic layer is provided between the first reactive mesogen layer and the second reactive mesogen layer.

3. The liquid crystal panel according to claim 1,
   wherein at least one of organic layer and/or inorganic layer is provided between the second reactive mesogen layer and the second alignment film.

* * * * *